L. H. LEMPKE.
VEHICLE WHEEL.
APPLICATION FILED MAY 12, 1911.
1,181,600.
Patented May 2, 1916.
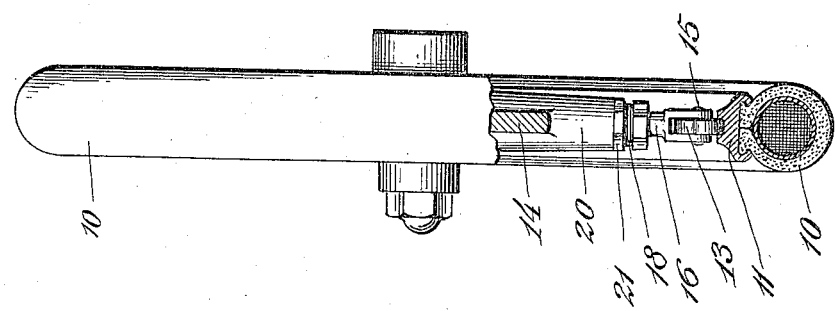
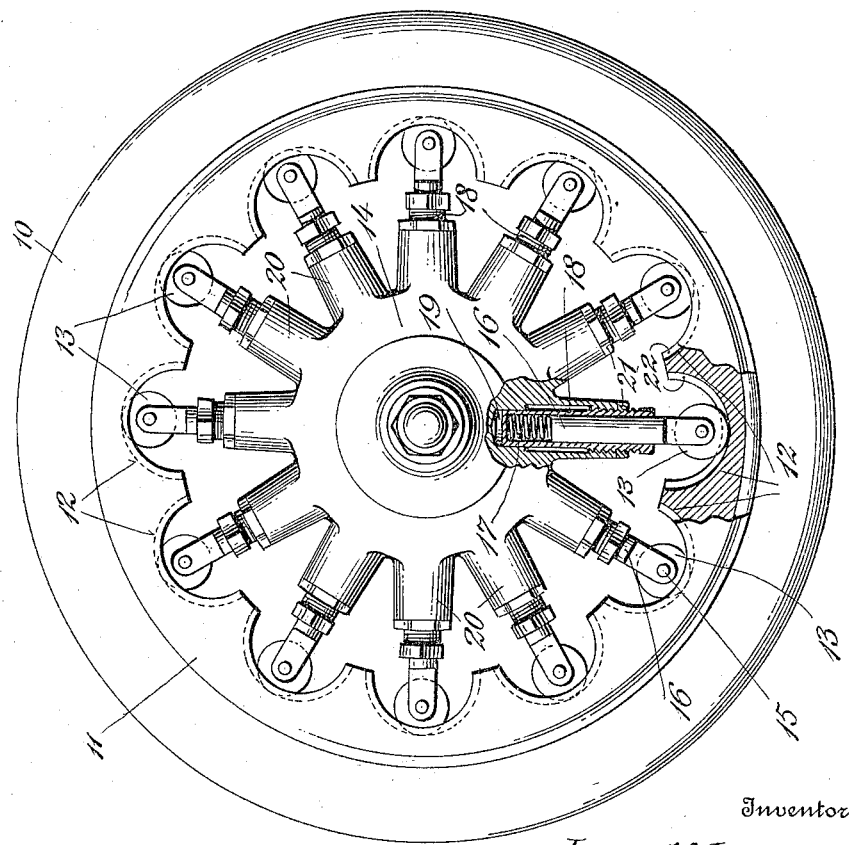
Witnesses
F. E. Ernst
Anna E. Rawler
Inventor
Louis H. Lempke,
By
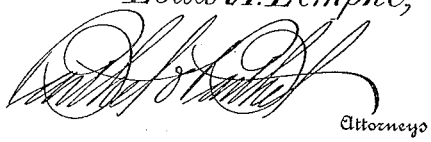
Attorneys

UNITED STATES PATENT OFFICE.

LOUIS H. LEMPKE, OF DETROIT, MICHIGAN.

VEHICLE-WHEEL.

1,181,600.  Specification of Letters Patent.  Patented May 2, 1916.

Application filed May 12, 1911. Serial No. 626,694.

*To all whom it may concern:*

Be it known that I, LOUIS H. LEMPKE, a citizen of the United States of America, residing at Detroit, in the county of Wayne and State of Michigan, have invented certain new and useful Improvements in Vehicle-Wheels, of which the following is a specification, reference being had therein to the accompanying drawings.

This invention relates to resilient wheels, especially to those used in connection with automobiles, and it has for its object the provision of a wheel in which the load carried by the axle is transferred onto the wheel rim by a series of spring-actuated plungers which are radially movable and the majority of which are forced inward or toward the center by a series of cam-faces provided on the wheel rim, these cam-faces being so shaped as to constitute also limiting stops for the eccentricity of the rim relatively to the axle when the latter carries a load.

Further objects of the invention will hereinafter appear and be particularly defined in the claim.

The invention has been clearly illustrated in the accompanying drawings in which similar characters denote similar parts, and in which—

Figure 1 represents a side view of a wheel embodying my invention, and Fig. 2 is an edge view thereof, partially broken away.

Referring to the drawings 10 denotes the tire which may be of any desired construction, and is held in the rim 11 preferably made of metal and having in its inner surface a series of arcuate cam-faces 12 which are in engagement with rollers 13 yieldingly carried by the hub member 14 of the wheel. In the present instance each roller 13 is journaled on a stud 15 carried by the bifurcated end of a plunger-rod 16, the inner end of which rests against a spring 17 which in turn is seated against the bottom of a cylindrical sleeve 18 having its plain inner end guided for rotation and longitudinal movements in a smooth-bored recess 19 of said hub member, while its outer end is in screw-threaded engagement with one of a series of spoke-like arms 20 secured to or forming a part of the hub member 14. As the same construction applies equally to all the other spring-supports of the wheel, it is evident that each spring may be placed under more or less tension without disturbing the normally-concentric relation between the hub and rim, this adjustment of the tension being accomplished in each instance by turning the sleeve in the arm whereby a longitudinal movement between these two parts will be effected. A check nut 21 serves to keep each sleeve in its adjusted position.

In order to preserve the rollers in engagement with the cam-faces and at the same time hold the rim against lateral displacement relatively thereto, each cam face is flanked by a pair of flanges 22 between which the roller may travel as in a groove.

In their preferred form shown, each cam face is shaped in the arc of a semi-circle so that its ends may project inward (toward the center of the wheel) far enough to serve as limits for movement of the rollers and to prevent their overriding those points. It will be noted that, by virtue of the peculiar organization, all the rollers below a horizontal line passing through the axis of the wheel, will become affected in degrees varying with the more or less perpendicular positions assumed by the plungers.

Many changes may be made in the particular construction and organization of the several elements of my improved wheel, without departing from the spirit of the invention, more especially in the shape of the cam-faces and in the adjustable features of the roller-carrying plungers.

I claim:—

A vehicle wheel comprising a one piece rim having an inner arcuate face forming symmetrically disposed cam surfaces each provided with a longitudinal groove intermediate the lateral margins of said face with the ends of said groove terminating in the inner face of said rim, and a hub member having rollers corresponding in number to the cam surfaces of said rim, said rollers engaging in the grooves with the flanges resulting from said grooves forming guides maintaining the rim and hub in operative lateral relation.

In testimony whereof I affix my signature in presence of two witnesses.

LOUIS H. LEMPKE.

Witnesses:
LEWIS E. FLANDERS,
FRANK E. ERNST.